US008848573B1

(12) United States Patent
Maxwell

(10) Patent No.: US 8,848,573 B1
(45) Date of Patent: Sep. 30, 2014

(54) BANDWIDTH CONSERVATION FOR MULTICAST TRAFFIC IN RF DOWNLINKS

(75) Inventor: Larus B. Maxwell, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 502 days.

(21) Appl. No.: 12/909,280

(22) Filed: Oct. 21, 2010

(51) Int. Cl.
| H04L 12/26 | (2006.01) |
| H04L 1/00 | (2006.01) |
| H04L 12/18 | (2006.01) |
| H04W 84/06 | (2009.01) |
| H04B 7/185 | (2006.01) |
| H04W 48/12 | (2009.01) |
| H04L 12/801 | (2013.01) |

(52) U.S. Cl.
CPC ............ H04L 12/185 (2013.01); *H04W 84/06* (2013.01); *H04W 20/51* (2013.01); *H04B 7/18534* (2013.01); *H04W 48/12* (2013.01); *H04L 12/1845* (2013.01); *H04L 47/35* (2013.01); H04B 7/18513 (2013.01)
USPC ............ 370/253; 370/230; 370/236; 370/241

(58) Field of Classification Search
CPC ... H04L 12/1845; H04L 47/35; H04W 48/12; H04W 84/06; H04H 20/51; H04B 7/18513; H04B 7/18534
USPC ......... 370/229, 330, 235, 236, 241, 252, 253, 370/370
See application file for complete search history.

(56) References Cited

U.S. PATENT DOCUMENTS

| 6,975,863 | B1 | 12/2005 | Miernik |
| 7,079,504 | B1 | 7/2006 | Leung et al. |
| 7,307,990 | B2 | 12/2007 | Rosen et al. |
| 7,346,053 | B1 | 3/2008 | Leung et al. |
| 7,373,394 | B1 | 5/2008 | Li et al. |
| 7,502,382 | B1 * | 3/2009 | Liu et al. ................. 370/432 |
| 7,561,523 | B1 * | 7/2009 | Revsin et al. ............ 370/236 |
| 7,839,843 | B2 | 11/2010 | Dontu et al. |
| 2002/0026525 | A1 * | 2/2002 | Armitage .................. 709/238 |
| 2002/0150099 | A1 * | 10/2002 | Pung et al. ............... 370/390 |
| 2006/0271293 | A1 * | 11/2006 | van Diggelen ........... 701/213 |
| 2006/0294549 | A1 * | 12/2006 | Schindler ..................... 725/48 |
| 2008/0095160 | A1 | 4/2008 | Yadav et al. |
| 2010/0054245 | A1 | 3/2010 | Asati et al. |
| 2010/0217879 | A1 * | 8/2010 | Weiner ..................... 709/228 |

OTHER PUBLICATIONS

BR Seminar—Space Workshop, "Creation of electronic notices with SpaceCap software" for submissions under Appendices 30, 30A and 30B, Nov. 2006, pp. 1-30.

(Continued)

*Primary Examiner* — Luat Phung
*Assistant Examiner* — Kai Chang
(74) *Attorney, Agent, or Firm* — Edell, Shapiro & Finnan, LLC

(57) ABSTRACT

In one embodiment a method includes receiving at an interface a join request for a multicast data stream, determining whether the multicast data stream is presently being transmitted within a same Downlink Broadcast Domain of which the interface is a member, and based on a result of the determining step one of (i) adding an identifier of the interface to an Outgoing Interface List when the multicast data stream is not presently being transmitted within a same Downlink Broadcast Domain of which the interface is a member or (ii) adding the identifier of the interface to a Candidate Outgoing Interface List when the multicast data stream is presently being transmitted within a same Downlink Broadcast Domain of which the interface is a member.

20 Claims, 6 Drawing Sheets

(56) References Cited

OTHER PUBLICATIONS

Ramanathan et al., "An Algorithm for Multicast Tree Generation in Networks with Asymmetric Links", IEEE (1996), pp. 337-344.
Filali et al., "Efficient Support of IP Multicast in the Nex Generation of Geo Satellites", IEEE Journal, vol. 22, No. 2, (Feb. 2004), pp. 413-425.
Ekici et al., "A Multicast Routing Algorithm for LEO Satellite IP Networks", IEEE/ACM Transactions on Networking, vol. 10, No. 2, (Apr. 2002), pp. 183-192.
Baras et al., "Fast Asymmetric Internet Over Wireless Satellite-Terrestrial Networks", IEEE (1997), pp. 1-6.
Fei et al., "Selecting Among Replicated Adaptive Multicast Servers", pp. 1-25, 2000.
Sabari, "Ant Based Adaptive Multicast Routing Protocol (AAMRP) for Mobile Ad Hoc Networks", International Journal of Compute Science and Information Security, vol. 6, No. 2 (2009), pp. 199-207.
Shukla, "Multicast Tree Construction in Network Topologies with Asymmetric Link Loads", (Sep. 30, 1994), pp. 1-25.
ETSI TS 102 294 Technical Specification, European Telecommunications Standards Institute (2004), pp. 1-22.

\* cited by examiner

BANDWIDTH CONSERVATION FOR MULTICAST TRAFFIC IN RF DOWNLINKS

TECHNICAL FIELD

The present disclosure relates to managing multicast data communications via a satellite.

BACKGROUND

A satellite utilizes a hub and spoke routing model, where the satellite is located at the hub and "surrounding" ground terminals are in communication with the satellite (hub) via links or spokes. Rather than viewing each spoke or link as a bi-directional link, each spoke may instead be viewed as a pair of asymmetrical, unidirectional links. In satellite environments bandwidth is an extremely precious commodity, making fine-grain control desirable. Since the hub has little control over the use of bandwidth on the upstream links (i.e., from respective ground terminals to the satellite), bandwidth conservation of this mechanism is focused on downstream links.

Fine-grain control is facilitated by providing individual descriptors, classifying, buffering, queuing and scheduling capabilities and resources for each downstream link. This works well for unicast traffic, but it can lead to sub-optimum bandwidth usage for downstream multicast traffic. Upstream traffic, i.e., in the spoke-to-hub direction, is not a candidate for optimization because spokes can only communicate with the hub, i.e., communication is point-to-point. This communication path is referred to as the "uplink." The hub has broadcast capabilities to all spokes from which bandwidth can be reclaimed. The hub-to-spoke direction is referred to as the "downlink."

DESCRIPTION OF EXAMPLE EMBODIMENTS

Overview

In one embodiment there is provided a method for conserving bandwidth for multicast traffic in radio frequency downlinks by receiving at an interface, such as a terminal interface aboard a satellite, a JOIN request for a multicast data stream, and determining whether the multicast data stream is presently being transmitted within a same Downlink Broadcast Domain of which the interface (over which the JOIN request was received) is a member. In the context of the instant description, a Downlink Broadcast Domain is defined as the set of downstream nodes that can receive and process the same data link layer transmission. Based on the result of the determining step, one of two lists is populated. When the multicast data stream is not presently being transmitted within a same Downlink Broadcast Domain of which the interface is a member, the identifier of the interface is added to an Outgoing Interface List (OIL). Alternatively, when the multicast data stream is presently (e.g., already) being transmitted within a same Downlink Broadcast Domain of which the interface is a member, the identifier of the interface, via which the multicast JOIN request was received, is added to a Candidate Outgoing Interface List. The Outgoing Interface List is used to enqueue multicast packets to selected terminal interfaces that can, together, serve all ground terminals that have made the multicast JOIN request. The Candidate Outgoing Interface List is used to keep track of duplicate terminal interfaces, whose identifiers may be moved to the Outgoing Interface List when an identifier already in the Outgoing Interface List is dropped or pruned from the multicast stream.

Example Embodiments

Figure 1:
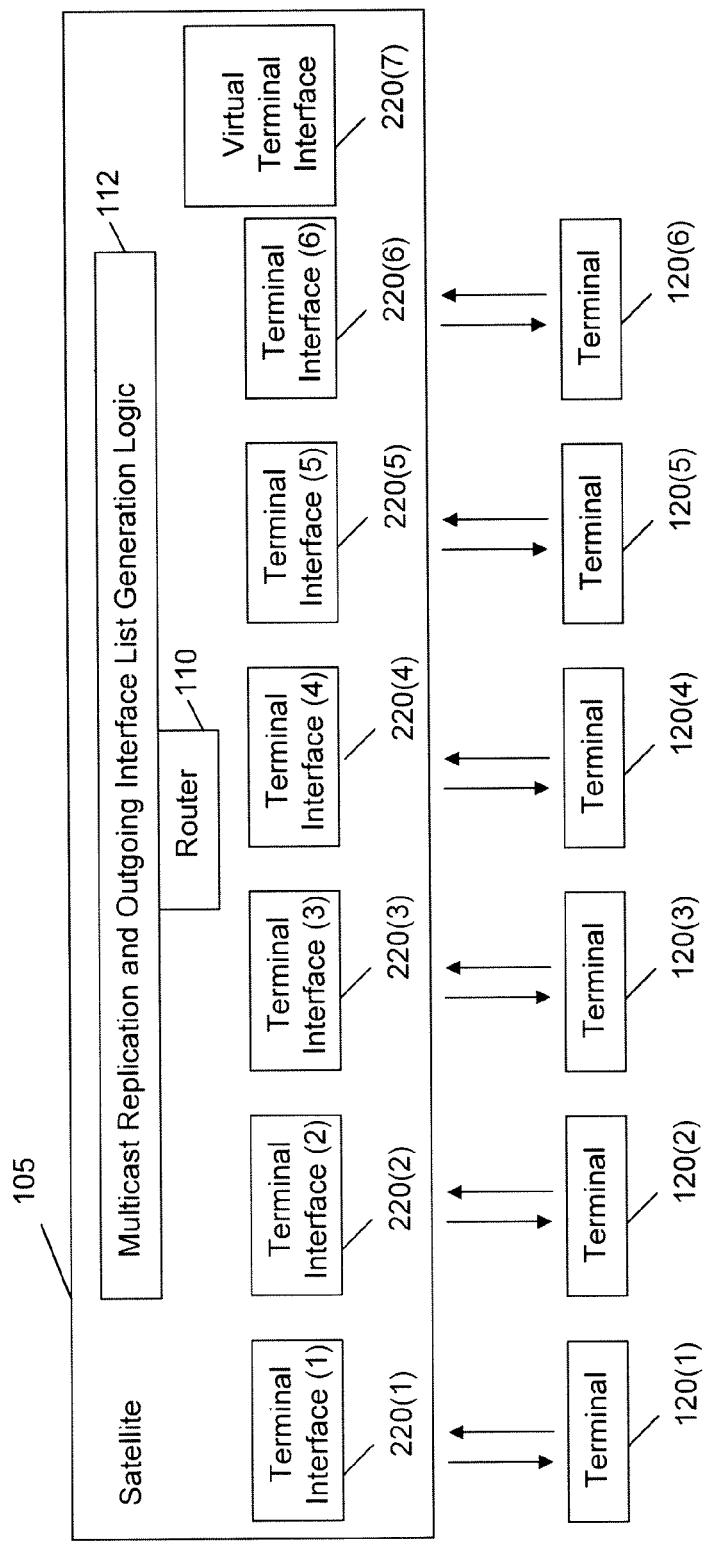
FIG. 1 shows a satellite including a router with Multicast Replication and Outgoing Interface List Generation Logic and terminal interfaces, which communicate with respective ground terminals.

FIG. 1 shows a satellite 105 including a router 110 with Multicast Replication and Outgoing Interface List Generation Logic 112 and terminal interfaces 220(1)-220(6), which communicate with respective ground terminals 120(1)-120(6). One or more virtual terminal interfaces, e.g., 220(7), may also be provided. Such a virtual terminal interface, however, unlike the other terminal interfaces, does not have a corresponding ground terminal. The use of virtual terminal interfaces is described later herein in connection with an alternative embodiment.

Unlike "bent-pipe" satellite systems, the router 110 of satellite 105 enables traffic received at one terminal interface 220 to be transmitted for downlink via any given one or several different terminal interfaces 220. Additionally, router 110 can be configured to apply quality of service policies to incoming and outgoing data, such that data passing via the satellite can be, e.g., throttled or otherwise controlled based on the type of data that is being routed. For example, a Voice over Internet Protocol (VoIP) telephone call might take precedence over a website data download.

FIG. 1 further shows uplinks and downlinks (indicated by arrows) between respective terminal interfaces 220 and ground terminals 120. Those skilled in the art will appreciate that, although not shown expressly in the drawing, a single terminal interface 220 might provide downlink data to multiple ground terminals 120.

Still referring to FIG. 1, Multicast Replication and Outgoing Interface List Generation Logic 112 is configured, as will be explained more fully below, to provide a more efficient use of downlink resources of the satellite 105, especially in connection with multicast traffic. More specifically, Multicast Replication and Outgoing Interface List Generation Logic 112 is used to populate two lists: an Outgoing Interface List (OIL) and a Candidate Outgoing Interface List (both shown in FIG. 3), and to replicate multicast packets consistent with the Outgoing Interface List. More specifically, the Outgoing Interface List is used by router 110 to select, based on terminal interface identifiers, appropriate terminal interfaces via which to send selected multicast data (e.g., packets), while the Candidate Outgoing Interface List is employed as, e.g., a repository of terminal interface identifiers whose respective terminal interfaces may be considered duplicative of the terminal interfaces identified in the Outgoing Interface List for given multicast traffic. Whether a given terminal interface might be considered duplicative is based on whether the given terminal interface belongs to a same Downlink Broadcast Domain (DBD) as another terminal interface that is already transmitting a given multicast packet within the same.

The concept of a Downlink Broadcast Domain is explained next in the context of Downlink Transmission Groups (DTGs). Those skilled in the art will appreciate that embodiments described herein can operate without Downlink Transmission Group segmentation at all, in the context of a single Downlink Transmission Group, or in the context of multiple Downlink Transmission Groups (as will be explained later herein with reference to FIG. 6, and in connection with virtual terminal interface 220(7)).

The terminal interfaces 220 and respective ground terminals 120 may be arranged in Downlink Transmission Groups which have various characteristics including, e.g., frequencies, capacities and waveforms. In one implementation, each downlink is associated with a Downlink Transmission Group and its traffic shares resources with traffic from other downlinks in the same Downlink Transmission Group. A downlink is always a member of a Downlink Transmission Group, however, its membership can be transferred to another Downlink Transmission Group. The downlink receives transmission resources only from the Downlink Transmission Group of which it is currently a member.

Time can be viewed as a series of transmission windows. For each transmission window, the transmission capacity of the collection of terminal interfaces 220 is allocated amongst the Downlink Transmission Groups on-board the satellite 105. The capacity of each Downlink Transmission Group is then, in turn, allocated to the downlinks which are currently members of that Downlink Transmission Group. The resources allocated to a Downlink Transmission Group, along with other characteristics can change over time. Thus, during a first transmission window, a Downlink Transmission Group may be allocated a first capacity, and allocated a second capacity during a second transmission, and so on.

As with other shared media, ground terminals 120 may receive (but ignore) traffic from the satellite 105 destined for other ground terminals 120. Downlink Transmission Groups influence this by limiting the traffic received to only those downlinks that share the same Downlink Transmission Group. Thus, in effect, the broadcast domain to which a downlink is a member can never contain members outside of its Downlink Transmission Group. Since terminal interfaces 220 and respective ground terminals 120 (i.e., spoke nodes) can move from one Downlink Transmission Group to another, those nodes also change their broadcast domain when they changes Downlink Transmission Group membership. A Downlink Transmission Group need not have only a single broadcast domain. Characteristics such as layer-1 encoding, layer-1 encryption, radio signatures, etc. can further segment the Downlink Transmission Group. The resulting segments are referred to herein as Downlink Broadcast Domains (DBDs). Thus, Downlink Broadcast Domains further restrict what traffic a spoke node (e.g., a ground terminal) is able to receive. A Downlink Transmission Group may have one or multiple Downlink Broadcast Domains. A downlink may change its Downlink Broadcast Domain without leaving the Downlink Transmission Group, but moving from one Downlink Transmission Group to another will result in a different Downlink Broadcast Domain. Thus, a spoke node's broadcast domain is defined by the tuple Downlink Transmission Group/Downlink Broadcast Domain. However, as mentioned, one may also look only to Downlink Broadcast Domains as defining a spoke node's broadcast domain, especially, where, e.g., no DTGs are defined, or where it might be assumed that only one Downlink Transmission Group is defined, e.g., a "global" Downlink Transmission Group.

Dynamically moving between broadcast domains is impacted by the constraint that a downlink's transition must not impact other downlinks, except for available capacity calculations. This constraint is one of the factors leading to the use of per-downlink queuing in this type of network. For unicast and non-optimized multicast services, this queuing model works without alteration. Embodiments described herein, however, provide a method to utilize the Downlink Broadcast Domain or Downlink Transmission Group/Downlink Broadcast Domain tuple to reclaim downstream bandwidth in a multicast context. The method described herein accommodates the fluid nature of the broadcast domains and meets the limited impact constraint without requiring protocol changes.

Multicasting is a technique for one-to-many communications over a network. Multicast implementations push packet replication as far away from the source as possible to more efficiently use network resources. In the embodiments described herein, router 110 and its associated Multicast Replication and Outgoing Interface List Generation Logic handle packet duplication and routing tasks.

Figure 2:
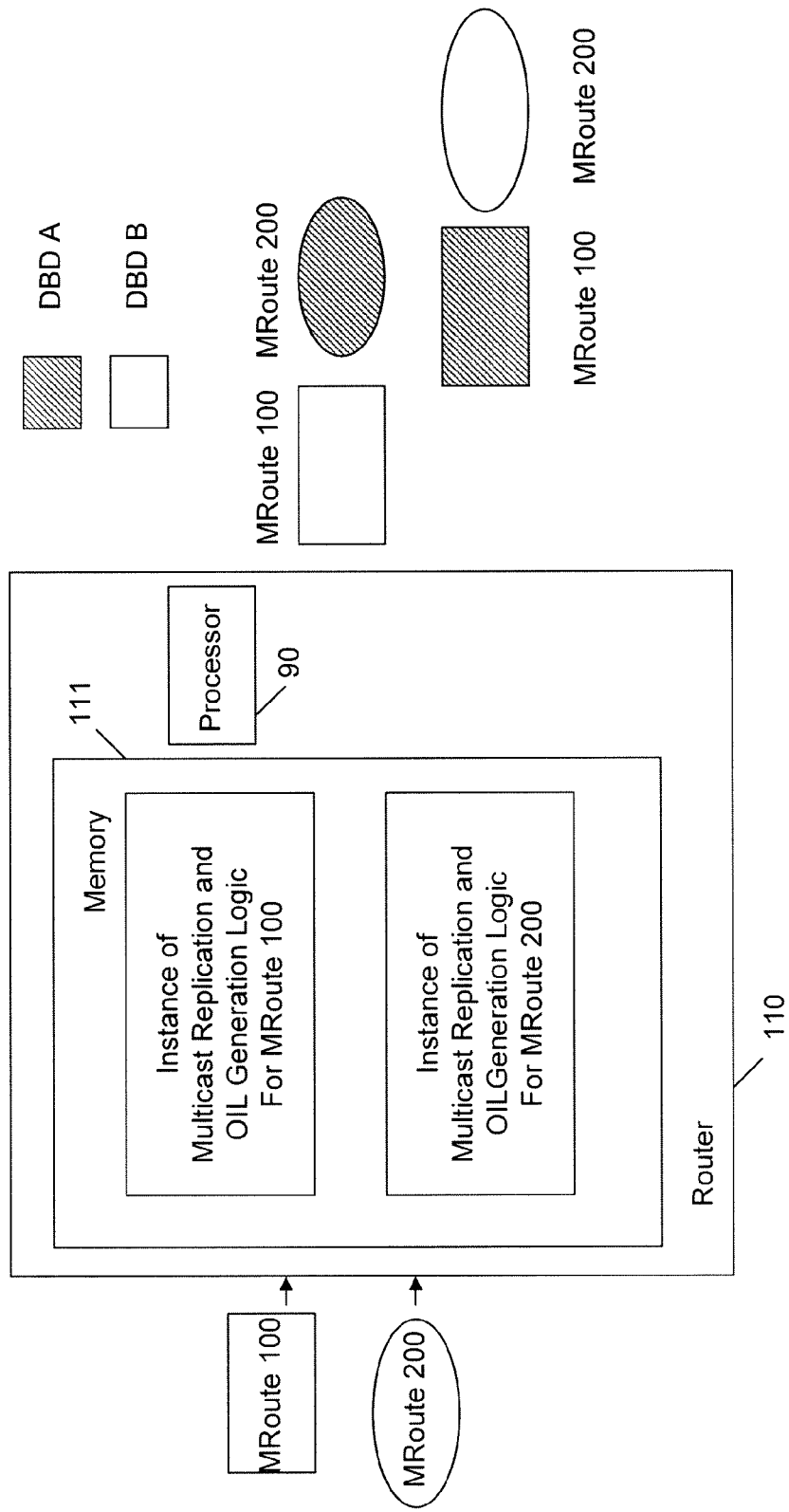
FIG. 2 shows the router including its Multicast Replication and Outgoing Interface List Generation Logic operating on different incoming packets to be multicast.

Reference is now made to FIG. 2, which shows router 110 including respective instances of its Multicast Replication and Outgoing Interface List Generation Logic operating on different incoming packets 100, 200 to be multicast. These packets are referred to as MRoute packets 100 and 200, where MRoute packet 100 is shown as a square and MRoute packet 200 is shown as an oval. These respective packets, might be, e.g., packets associated with streaming video, audio, or other streaming data that is a candidate for multicast. In an embodiment, one or more ground terminals 120 (or computers associated with such ground terminals) might previously have sent a multicast "JOIN" request for a stream of which MRoute packet 100 and/or MRoute packet 200 are a part. In response, Multicast Replication and Outgoing Interface List Generation Logic 112 processes MRoute packets 100, 200 accordingly. That is, router 110, e.g., using its memory 111 and processor 90, replicates and routes MRoute packet 100 and MRoute packet 200 consistent with the Outgoing Interface List shown in FIG. 3.

As is seen in FIG. 2, MRoute packet 100 (the square) may be replicated for each Downlink Broadcast Domain in which a multicast JOIN has been received. Likewise, MRoute packet 200 (the oval) may also be replicated for each Downlink Broadcast Domain in which a multicast JOIN has been received. Thus, the output of router 110 is a stream of MRoute packets consistent with the Outgoing Interface List. MRoute packets that are to be sent within Downlink Broadcast Domain "A" are shown with hatching, and MRoute packets that are to be sent within Downlink Broadcast Domain "B" are shown as clear.

Figure 3:
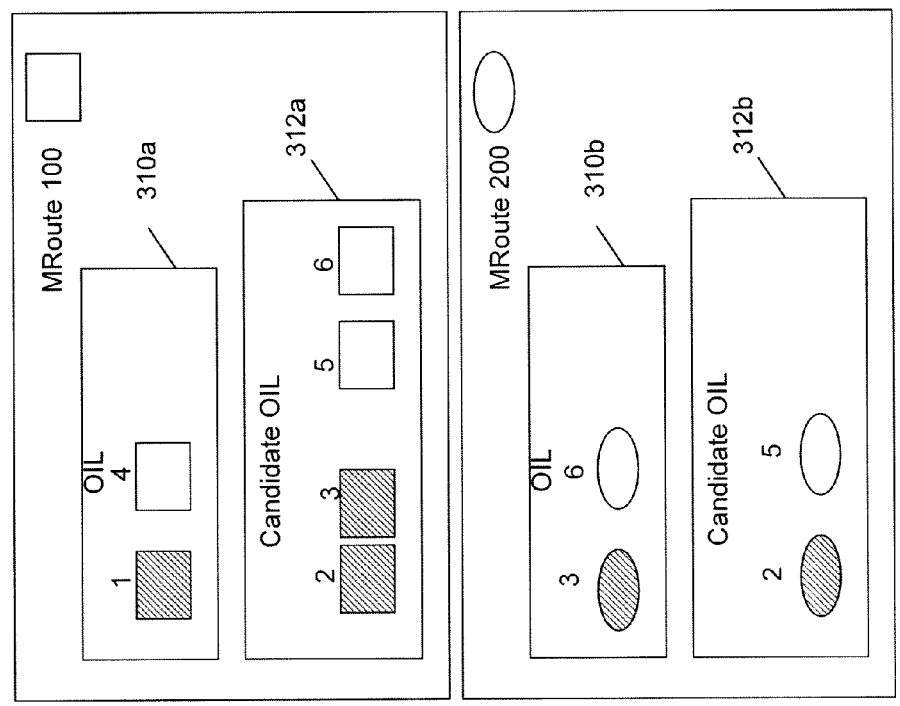
FIG. 3 shows an arrangement of an Outgoing Interface List and a Candidate Outgoing Interface List generated using the Multicast Replication and Outgoing Interface List Generation Logic for two different multicast data streams.

Reference is now made to FIG. 3, which shows an arrangement of Outgoing Interface Lists 310a, 310b and Candidate Outgoing Interface Lists 312a, 312b generated using the Multicast Replication and Outgoing Interface List Generation Logic 112. For each MRoute packet 100, 200 (and taking MRoute packet 100 as an example) two lists are generated: an Outgoing Interface List 310a, and a Candidate Outgoing Interface List 312a. The Outgoing Interface List 310a contains a list of identifiers that correspond to terminal interfaces 220. Thus, Outgoing Interface List 310a for MRoute 100 contains the identifiers 1 and 4 that correspond to, e.g., terminal interfaces 220(1) and 220(4). In operation, router 110 will route MRoute packets 100 via terminal interfaces 220(1) and 220(4). Notice that terminal interfaces 220(1) and 220(4)

are respectively in Downlink Broadcast Domains A and B, thus covering all Downlink Broadcast Domains for MRoute 100.

The Candidate Outgoing Interface List 312a contains a list of identifiers of terminal interfaces that can be considered to be duplicative of those identifiers listed in Outgoing Interface List 310a. Specifically, since, e.g., terminal interface 220(2) is part of Downlink Broadcast Domain A (hatched) and MRoute packet 100 is already being transmitted via terminal interface 220(1) (since identifier 1 is listed in the Outgoing Interface List), there is no need to also send MRoute packet 100 for DBD A via terminal interface 220(2) since the corresponding ground terminal (e.g., terminal 120(2)) can just as easily receive MRoute packet 100 via the transmission from terminal interface 220(1). In this way, multicast traffic being handled by satellite 105 can be more efficiently transmitted in that fewer downlink resources are utilized for a given multicast data session.

As further shown in FIG. 3, an Outgoing Interface List 310b and Candidate Outgoing Interface List 312b are also maintained for MRoute packet 200. Those skilled in the art will appreciate that similar lists can be generated and maintained for any multicast packet (stream) that router 110 is responsible for routing.

Figure 4:
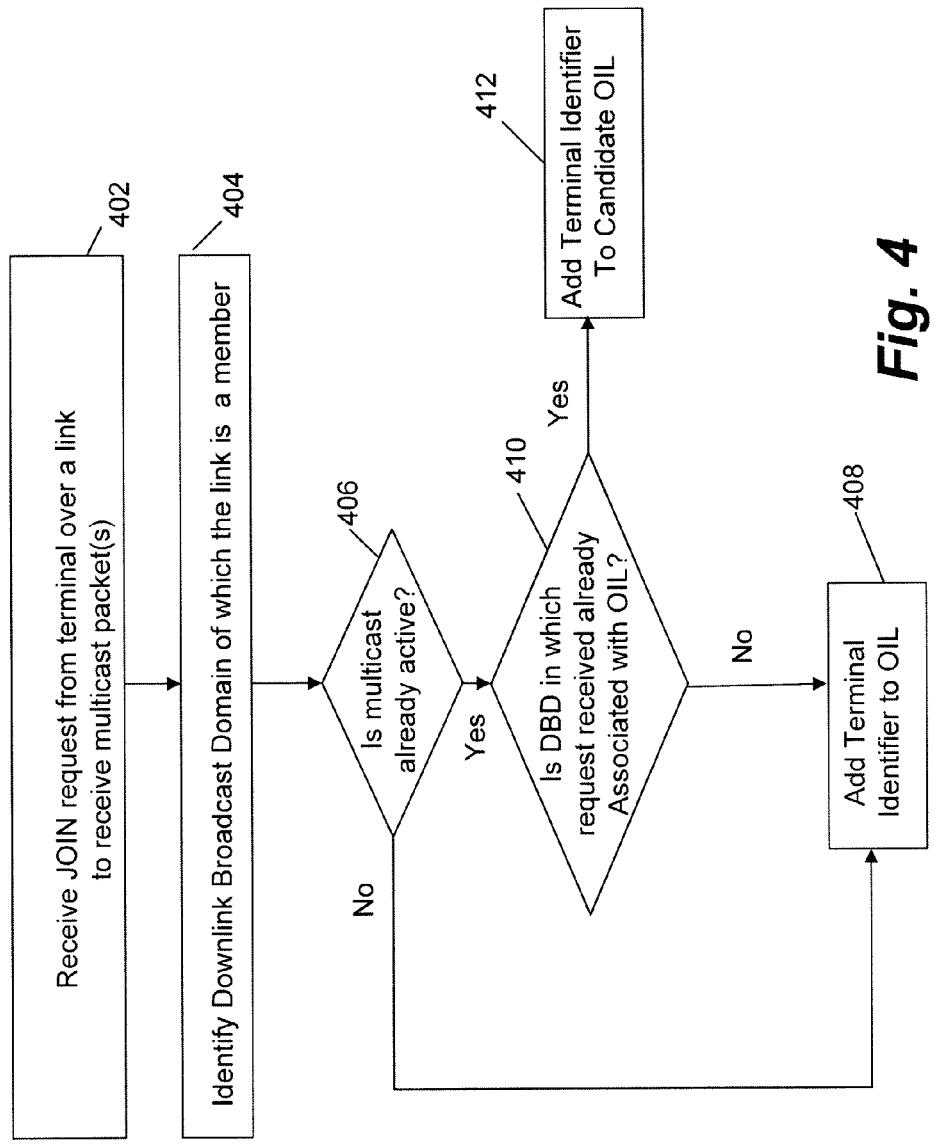
FIGS. 4 and 5 depict example series of steps consistent with the Multicast Replication and Outgoing Interface List Generation Logic.

FIG. 4 depicts an example series of steps for generating an Outgoing Interface List and a Candidate Outgoing Interface List consistent with the Multicast Replication and Outgoing Interface List Generation Logic 112. At step 402 a request, such as a multicast JOIN request, is received over a link from a ground terminal. In this case, the ground terminal is signaling an interest in receiving a selected multicast stream. At step 404 the Multicast Replication and Outgoing Interface List Generation Logic 112 identifies the Downlink Broadcast Domain of which the link is a member. In the example provided above, the Downlink Broadcast Domain may be of, e.g., the "A" (hatched) variety or "B" (clear) variety. At step 406, it is determined whether the selected multicast stream is being routed at all by the router. If not, the illustrated process proceeds to step 408 at which the multicast stream (e.g., MRoute packet 100) is added to a newly created Outgoing Interface List for MRoute 100 and the identifier for the terminal interface that is serving the ground terminal via which the multicast JOIN request was received is added to the Outgoing Interface List.

If, on the other hand, at step 406, the requested multicast traffic (e.g., multicast stream) is already being processed by the router 110, then the process moves to step 410. Such a state means that at least one identifier of a terminal interface is listed in an Outgoing Interface List for that multicast stream, although the Downlink Broadcast Domain for that terminal interface might not be the same as the Downlink Broadcast Domain of the terminal via which the new multicast JOIN request was received.

As a result, the illustrated process proceeds to step 410 where it is determined whether the Downlink Broadcast Domain of the terminal interface over which the multicast JOIN request (for the selected multicast stream) was received is already being serviced by the router 110. This can be determined by, for example, checking the multicast stream's Outgoing Interface Lists for a terminal identifier who's Downlink Broadcast Domain matches the Downlink Broadcast Domain of the terminal interface over which the multicast JOIN request was received. If found, the illustrated process moves to step 412, wherein the terminal identifier for the terminal interface over which the multicast JOIN request was received is added to the Candidate Outgoing Interface List as being duplicative.

If none of the terminal interfaces currently on the selected multicast stream's Outgoing Interface List has a Downlink Broadcast Domain matching the Downlink Broadcast Domain of the terminal interface over which the multicast JOIN request was received, then the process moves to step 408, wherein the Outgoing Interface List is updated as described above.

Thus, as those skilled in the art will appreciate, the illustrated process performed by, e.g., the Multicast Replication and Outgoing Interface List Generation Logic 112, enables a router aboard a satellite to classify multicast traffic by Downlink Broadcast Domain and transmit the multicast traffic via a reduced number of terminal interfaces on-board the satellite. This is accomplished, stated alternatively, by receiving at an interface (e.g., a satellite terminal interface) a join request for a multicast data stream, determining whether the multicast data stream is presently being transmitted within a same Downlink Broadcast Domain of which the interface is a member, and then proceeding based on the result of the determination. Namely, when the multicast data stream is not presently being transmitted within a same Downlink Broadcast Domain of which the interface is a member, the identifier of the interface is added to an Outgoing Interface List, or when the multicast data stream is presently being transmitted within a same Downlink Broadcast Domain of which the interface is a member, the identifier of the interface is added to a Candidate Outgoing Interface List. In this way, each terminal interface over which a multicast JOIN request is received is tracked, yet only a selected number of those terminal interfaces is ultimately used to send downlink traffic corresponding to the request multicast traffic.

Figure 5:
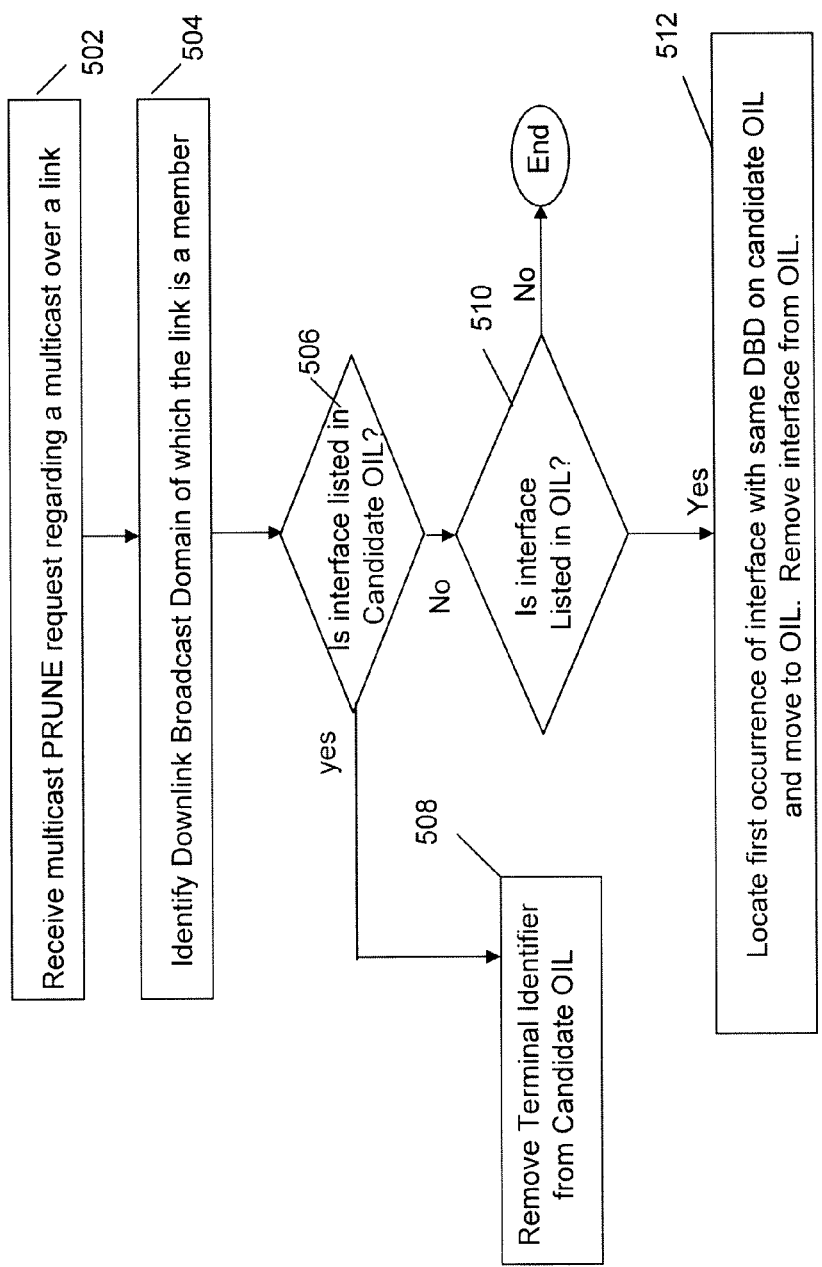

Identifiers of terminal interfaces can also be removed from the lists in response to a multicast PRUNE request. Referring to FIG. 5, there is shown an example series of steps for updating an Outgoing Interface List and a Candidate Outgoing Interface List when a PRUNE request is received. At step 502, a PRUNE request is received regarding a selected multicast stream. At step 504, the Downlink Broadcast Domain of the interface (or link) is identified. At step 506, it is determined whether the interface over which the PRUNE request was received is listed in the Candidate Outgoing Interface List. If yes, at step 508, the corresponding identifier in the Candidate Outgoing Interface List is removed from the list.

If the interface over which the PRUNE request is not in the Candidate Outgoing Interface List, then at step 510 it is determined whether the identifier of the interface is listed in the Outgoing Interface List. If not, the process ends, as the interface is not being tracked by the Multicast Replication and Outgoing Interface List Generation Logic 112. If, on the other hand, the interface is listed in the Outgoing Interface List, then at step 512 the process locates the first occurrence of an interface with the same Downlink Broadcast Domain on the Candidate Outgoing Interface List and moves the identifier thereof to the Outgoing Interface List. The interface that is to be pruned is then removed from the Outgoing Interface List.

Figure 6:
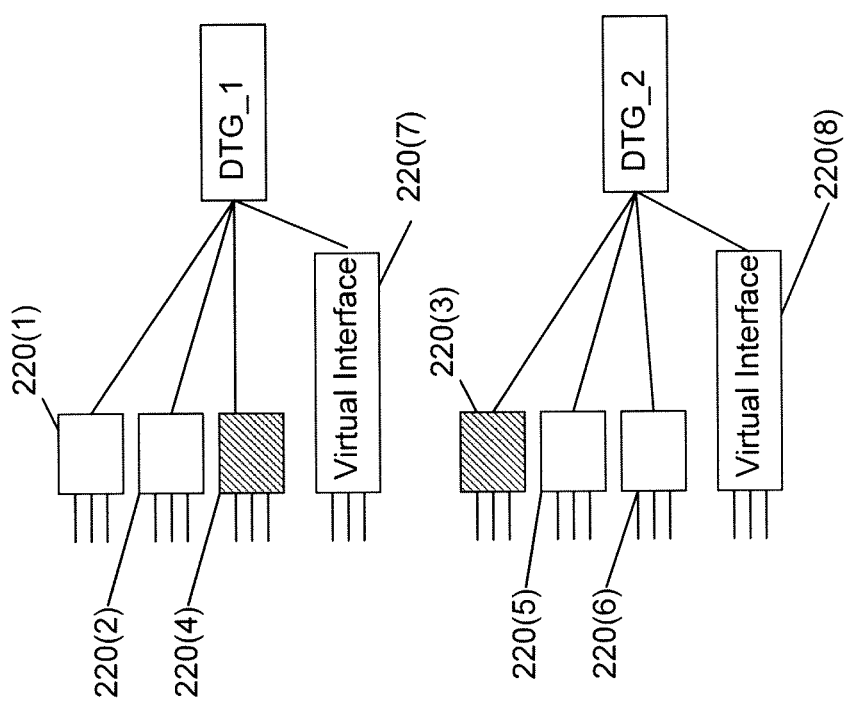
FIG. 6 depicts an embodiment that takes into account Downlink Transmission Groups in connection with generating an Outgoing Interface List.

In an alternative embodiment, the Downlink Transmission Group is also taken into account in connection with generating an Outgoing Interface List and a Candidate Outgoing Interface List. Referring to FIG. 6, each terminal interface 220(1)-220(6) is associated with a particular downlink transmission group (e.g., a particular frequency). As shown in the drawing, terminal interfaces 220(1), 220(2) and 220(4) are associated with DTG_1, whereas terminal interfaces 220(3), 220(5) and 220(6) are associated with DTG_2. As further shown, each Downlink Transmission Group can support multiple, different Downlink Broadcast Domains, as indicated by the clear and hatched fills of the interfaces. Also shown in FIG. 6 are two virtual interfaces 220(7) and 220(8), respectively associated with DTG_1 and DTG_2. In one implementation, virtual interfaces 220(7) and 220(8) are not associated with, e.g., a ground terminal. Rather, these virtual interfaces are used as an internal mechanism to enqueue, using the Outgoing Interface List, multicast packets for transmission to ground terminals that have made a JOIN request for multicast traffic.

Thus, in accordance with this alternative embodiment, for each Downlink Transmission Group/Downlink Broadcast Domain combination, the first downlink requesting a multicast route (MRoute packet) acts as a proxy and is added to the Outgoing Interface List for that MRoute packet. If the role of proxy is already taken, the downlink is added to the Candidate List for the MRoute packet.

In this alternative embodiment, packets are replicated based upon the proxies, but are enqueued to a Downlink Transmission Group's broadcast downlink, namely the respective virtual terminal interface 220(7), 220(8), rather than to the downlink itself, namely the actual terminal interfaces 220(1)-220(6), as the case may be. Downlink Transmission Group and Downlink Broadcast Domain identifiers can be included in a private packet header that is passed between the router 110 and modems operating in conjunction with the terminal interfaces 220. This private packet header may be used for all packets. When the proxy downlink leaves a multicast group, or if the downlink changes either its Downlink Transmission Group or Downlink Broadcast Domain membership, a replacement proxy downlink is selected from the Candidate List of the MRoute packet.

Thus, in this alternative embodiment, the Outgoing Interface List(s) can likewise be employed to supply a more limited number of replicated packets to a virtual terminal interface.

The functionality of each of the Multicast Replication and Outgoing Interface List Generation Logic 112 described above may be implemented as one or more hardware components, one or more software components, or combinations thereof. More specifically, the processor 90 used in conjunction with Multicast Replication and Outgoing Interface List Generation Logic 112 may be comprised of a programmable processor (microprocessor or microcontroller) or a fixed-logic processor. In the case of a programmable processor, any associated memory (e.g., 111) may be of any type of tangible processor readable memory (e.g., random access, read-only, etc.) that is encoded with or stores instructions. Alternatively, the processor 90 may be comprised of a fixed-logic processing device, such as an application specific integrated circuit (ASIC) or digital signal processor that is configured with firmware comprised of instructions or logic that cause the processor to perform the functions described herein. Thus, the Multicast Replication and Outgoing Interface List Generation Logic 112 may take any of a variety of forms, so as to be encoded in one or more tangible media for execution, such as with fixed logic or programmable logic (e.g., software/computer instructions executed by a processor) and any processor may be a programmable processor, programmable digital logic (e.g., field programmable gate array) or an ASIC that comprises fixed digital logic, or a combination thereof. In general, any process logic may be embodied in a processor or computer readable medium that is encoded with instructions for execution by a processor that, when executed by the processor, are operable to cause the processor to perform the functions described herein.

Although the system and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:

1. A method comprising:
receiving at a satellite terminal interface of a satellite, a join request for a multicast data stream;
determining whether the multicast data stream is presently being transmitted via a plurality of satellite terminal interfaces to a plurality of ground terminals within a same Downlink Broadcast Domain of which the satellite terminal interface is a member, wherein a Downlink Broadcast Domain comprises a set of satellite terminal interface resources shared among satellite terminal interface members of the Downlink Broadcast Domain such that any downlink transmission resources that the satellite terminal interface is allocated for transmission are received by way of membership in the Downlink Broadcast Domain; and
adding an identifier of the satellite terminal interface to a Candidate Outgoing Interface List when the multicast data stream is presently being transmitted within a same Downlink Broadcast Domain of which the satellite terminal interface is a member, wherein the satellite terminal identifier is configured to identify the satellite terminal interface as a duplicate satellite terminal interface already transmitting the multicast data stream within the Downlink Broadcast Domain, wherein when the satellite terminal interface is identified as a duplicate satellite terminal interface for the multicast data stream, the satellite terminal interface does not transmit the multicast data stream unless the identifier of the satellite terminal interface is added to an Outgoing Interface List.

2. The method of claim 1, further comprising maintaining the Outgoing Interface List and transmitting packets of the multicast data stream via satellite terminal interfaces whose respective identifiers are listed in the Outgoing Interface List.

3. The method of claim 2, further comprising moving an identifier of a satellite terminal interface from the Candidate Outgoing Interface List to the Outgoing Interface List when another satellite terminal interface having a same Downlink Broadcast Domain is pruned from the multicast data stream and its corresponding identifier is removed from the Outgoing Interface List.

4. The method of claim 2, further comprising enqueuing packets of the multicast data stream for downlink transmission by the satellite terminal interface based on contents of the Outgoing Interface List.

5. The method of claim 2, further comprising communicating content of the Outgoing Interface List and the Candidate Outgoing Interface List to a router.

6. The method of claim 4, further comprising transmitting the enqueued packets of the multicast data stream from the satellite using the satellite terminal interface.

7. The method of claim 1, further comprising determining a Downlink Transmission Group of which the interface is a part, wherein the Downlink Transmission Group comprises satellite terminals configured to transmit the multicast data stream to ground terminals with the similar RF characteristics.

8. The method of claim 7, further comprising transmitting the packets of the multicast data stream via a virtual interface for which there is no corresponding receiving terminal and that is representative of the Downlink Transmission Group.

9. Logic encoded on one or more tangible media for execution and when executed operable to:
receive at a satellite terminal interface of a satellite, a join request for a multicast data stream;
determine whether the multicast data stream is presently being transmitted via a plurality of satellite terminal interfaces to a plurality of ground terminals within a same Downlink Broadcast Domain of which the satellite terminal interface is a member, wherein a Downlink Broadcast Domain comprises a set of satellite terminal interface resources shared among satellite terminal interface members of the Downlink Broadcast Domain such that any downlink transmission resources that the satellite terminal interface is allocated for transmission are received by way of membership in the Downlink Broadcast Domain; and
add an identifier of the satellite terminal interface to a Candidate Outgoing Interface List when the multicast data stream is presently being transmitted within a same Downlink Broadcast Domain of which the interface is a member, wherein the satellite terminal identifier is configured to identify the satellite terminal interface as a duplicate satellite terminal interface already transmitting the multicast data stream within the Downlink Broadcast Domain, wherein when the satellite terminal interface is identified as a duplicate satellite terminal interface for the multicast data stream, the satellite terminal interface does not transmit the multicast data stream unless the identifier of the satellite terminal interface is added to an Outgoing Interface List.

10. The logic of claim 9, when executed, further operable to maintain the Outgoing Interface List and to cause packets of the multicast data stream to be transmitted via satellite terminal interfaces whose respective identifiers are listed in the Outgoing Interface List.

11. The logic of claim 10, when executed further operable to move an identifier of a satellite terminal interface from the Candidate Outgoing Interface List to the Outgoing Interface List when another satellite terminal interface having a same Downlink Broadcast Domain is pruned from the multicast data stream and its corresponding identifier is removed from the Outgoing Interface List.

12. The logic of claim 10, when executed, further operable to enqueue packets of the multicast data stream for downlink transmission by the satellite terminal interface based on contents of the Outgoing Interface List.

13. The logic of claim 11, when executed, further operable to communicate content of the Outgoing Interface List and the Candidate Outgoing Interface List to a router.

14. The logic of claim 12, when executed, further operable to cause a router to route the multicast data stream from the satellite.

15. The logic of claim 9, when executed, further operable to determine a Downlink Transmission Group of which the interface is a part, wherein the Downlink Transmission Group comprises satellite terminals configured to transmit the multicast data stream to ground terminals with the similar RF characteristics.

16. The logic of claim 15, when executed, further operable to cause the packets of the multicast data stream to be transmitted via a virtual interface for which there is no corresponding receiving terminal and that is representative of the Downlink Transmission Group.

17. A satellite system comprising:
a processor;
a memory in communication with the processor; and
a plurality of satellite terminal interfaces configured to transmit packet data according to interface identifiers stored in the memory,
wherein the processor is configured to:
receive at a given satellite terminal interface a join request for a multicast data stream;
determine whether the multicast data stream is presently being transmitted via a plurality of satellite terminal interfaces to a plurality of ground terminals within a same Downlink Broadcast Domain of which the given satellite terminal interface is a member, wherein a Downlink Broadcast Domain comprises a set of satellite terminal interface resources shared among satellite terminal interface members of the Downlink Broadcast Domain such that any downlink transmission resources that the given satellite terminal interface is allocated for transmission are received by way of membership in the Downlink Broadcast Domain; and
add an identifier of the given satellite terminal interface to a Candidate Outgoing Interface List in the memory when the multicast data stream is presently being transmitted within a same Downlink Broadcast Domain of which the given terminal interface is a member, wherein the satellite terminal identifier is configured to identify the satellite terminal interface as a duplicate satellite terminal interface already transmitting the multicast data stream within the Downlink Broadcast Domain, wherein when the given satellite terminal interface is identified as a duplicate satellite terminal interface for the multicast data stream, the given satellite terminal interface does not transmit the multicast data stream unless the identifier of the given satellite terminal interface is added to an Outgoing Interface List.

18. The system of claim 17, wherein the processor is further configured to move an identifier of the given satellite terminal interface from the Candidate Outgoing Interface List to the Outgoing Interface List when another satellite terminal interface having a same Downlink Broadcast Domain is pruned from the multicast data stream and its corresponding identifier is removed from the Outgoing Interface List.

19. The system of claim 18, wherein the processor is further configured to cause content of the Outgoing Interface List and the Candidate Outgoing Interface List to be communicated to a router.

20. The system of claim 18, wherein the processor is further configured to cause the multicast data stream to be transmitted from the satellite using the given satellite terminal interface.

* * * * *